(12) United States Patent
Zhou et al.

(10) Patent No.: US 8,359,124 B2
(45) Date of Patent: Jan. 22, 2013

(54) ENERGY OPTIMIZATION SYSTEM

(75) Inventors: Zhi Zhou, Selkirk, NY (US); Juan Manuel de Bedout, West Glenville, NY (US); John Michael Kern, Rexford, NY (US); Emrah Biyik, Guilderland, NY (US); Ramu Sharat Chandra, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 237 days.

(21) Appl. No.: 12/640,021

(22) Filed: Dec. 17, 2009

(65) Prior Publication Data

US 2011/0106328 A1 May 5, 2011

Related U.S. Application Data (60) Provisional application No. 61/258,412, filed on Nov. 5, 2009.

(51) Int. Cl.
*G05D 17/02* (2006.01)
(52) U.S. Cl. ........................................ 700/291; 700/276
(58) Field of Classification Search ................ 700/9, 28, 700/33, 276, 291, 32, 171; 705/14.43; 706/19
See application file for complete search history.

(56) References Cited

U.S. PATENT DOCUMENTS

| | | | | |
|---|---|---|---|---|
| 4,061,185 A | * | 12/1977 | Faiczak | 165/48.1 |
| 5,717,609 A | * | 2/1998 | Packa et al. | 702/130 |
| 6,785,592 B1 | * | 8/2004 | Smith et al. | 700/291 |
| 2003/0005073 A1 | | 1/2003 | Yoshizawa et al. | |
| 2003/0042794 A1 | * | 3/2003 | Jarrett, Jr. | 307/23 |
| 2008/0028147 A1 | | 1/2008 | Jacobson et al. | |
| 2009/0008890 A1 | | 1/2009 | Woodford | |

OTHER PUBLICATIONS

Celli et al., "A Multi-objective Formulation for the Optimal Sizing and Siting of Embedded Generation in Distribution Networks", IEEE 2003.*
Chi-Tsong Chen, "Linear System Theory and Design", pp. 86-93, Oxford University Press 1999.*
Yan et al., "Adaptive optimal control model for building cooling and heating sources", Energy and Buildings, pp. 1394-1401, Elsevier 2008.*

* cited by examiner

*Primary Examiner* — Carlos Ortiz Rodriguez
(74) *Attorney, Agent, or Firm* — Nitin Joshi (57) ABSTRACT

A system for optimizing customer utility usage in a utility network of customer sites, each having one or more utility devices, where customer site is communicated between each of the customer sites and an optimization server having software for optimizing customer utility usage over one or more networks, including private and public networks. A customer site model for each of the customer sites is generated based upon the customer site information, and the customer utility usage is optimized based upon the customer site information and the customer site model. The optimization server can be hosted by an external source or within the customer site. In addition, the optimization processing can be partitioned between the customer site and an external source.

23 Claims, 11 Drawing Sheets

ENERGY OPTIMIZATION SYSTEM

CROSS-REFERENCE TO RELATED APPLICATIONS

This application claims the benefit of pending provisional application Ser. No. 61/258,412, filed Nov. 5, 2009. This application is related to co-pending application entitled "ENERGY OPTIMIZATION METHOD" filed concurrently.

STATEMENT REGARDING FEDERALLY SPONSORED RESEARCH OR DEVELOPMENT

This invention was made with Government support under contract number DE-FC26-06NT42847 awarded by U.S. Department of Energy. The Government has certain rights in the invention.

BACKGROUND

Efficient energy management systems are desired by utilities and customers in order to reduce costs and peak demand to provide more efficient energy use. Various measures have been developed to address energy management goals. For example, energy efficient devices and appliances have been developed to enable customers to manage energy consumption. In addition, utilities have provided some customers with direct control for certain electrical loads, such as heating or cooling devices, pool pumps, and so on, to allow utilities to control energy and power usage. Also, utilities have implemented demand response programs for residential as well as industrial customers in order to provide reduced peak demand requirements and to effectively manage energy consumption.

While a number of developments have been made to enable customers and the utilities to manage consumption on the grid, the integration, automation, and optimization of these devices into an intelligent system that monitors and manages consumption and effectively communicates information between the utilities and the customers are still being developed.

For these and other reasons, there is a need for the present invention.

SUMMARY

A system for optimizing customer utility usage in a utility network of customer sites, each having one or more utility devices, where customer site is communicated between each of the customer sites and an optimization server having software for optimizing customer utility usage over one or more networks, including private and public networks. A customer site model for each of the customer sites is generated based upon the customer site information, and the customer utility usage is optimized based upon the customer site information and the customer site model. The optimization server can be hosted by an external source or within the customer site. In addition, the optimization processing can be partitioned between the customer site and an external source.

BRIEF DESCRIPTION OF THE DRAWINGS

The nature and various additional features of the invention will appear more fully upon consideration of the illustrative embodiments of the invention which are schematically set forth in the figures. Like reference numerals represent corresponding parts.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

As used herein, the term "module" refers to software, hardware, firmware, or any combination of these, or any system, process, or functionality that performs or facilitates the processes described herein.

Embodiments of the invention are described with reference to a particular example of an electric utility. However, this example is only used to facilitate description of embodiments of the invention and in no way limits the scope of the invention. Embodiments of the invention can be applied to any utility network or applied to any other suitable application. In addition, the customer sites disclosed herein may be residential homes, apartment buildings, industrial, commercial, educational, military, and/or office buildings, for example.

According to an embodiment of the invention, an Energy Optimization System (EOS) module includes an energy management platform that interfaces with smart meters, smart loads and devices, and sensors, within a customer site such as a customer home or commercial building as well as with smart energy generation and energy storage components. The customer interfaces with the EOS module through a user interface having a display. The EOS module is an energy optimizing engine, which is based on model predictive controls. The energy optimizing engine utilises dynamic variable data such as forecast weather, solar insolation, and cost of electricity, along with historic and real-time data from sensors within the customer site and a model of the customer site to plan the optimal usage of the energy generated at the customer site, the storage level of energy storage and the operation of the loads. In addition, according to embodiments of the invention, the customer is provided with a real-time estimate of energy uses and monthly savings, as the customer makes adjustments to his/her preferences on the user interface. The utility is provided with the validation and quantification of actions from demand response events and the estimation of customer actions in the event of a utility demand response request.

The energy optimizing system module according to embodiments of the invention can be utilised in many different conservation or incentive programs and scenarios. It can be used for many different functions such as energy site automation, education and information, and tracking and reporting. The EOS module enables the customer and the utility to capture a significant entitlement of smart grid ownership and load ownership as it allows the various subsystems to work in unison as a single system.

With regard to site energy optimization and automation functions, the EOS module optimizes and automates the energy savings, empty site setbacks, pre-cooling/pre-heating of the site for peak load reduction, and peak load reduction operation of all the major loads including appliances, heating, ventilating and air conditioning (HVAC), water heating, lighting, and miscellaneous electric loads. The EOS module receives pricing signals from a utility smart meter, such as time-of-use rate tariff, real-time pricing tariff or critical peak pricing, and determines optimized energy usage based on the received information. The EOS module also receives forecast weather and solar insolation from weather servers, which reside on a public network such as the Internet, and parses it for usage in the optimizer module. The EOS module interfaces with all major loads via a wireless network using an interface such as the Zigbee protocol, for example. Communication between the customer sites and the utility occurs via a public network or a WAN such as the Internet. Customer specific or sensitive information can be communicated via a secure private network, which may be a wireless network.

With regard to the education and informational function, the EOS module provides real-time estimates on the customer display of energy usage and utility cost. The estimates can be showed for what is saved at the end of the month or for the next billing cycle (e.g., 30 days from now). The EOS module utilises historical trends and forecast information to make this estimate.

With regard to tracking and reporting, the EOS module reports on the customer display real-time usage of electricity. The information is stored and is trended over various time intervals (e.g., in days, weeks, months, and years). A similar tracking and reporting scheme can be easily implemented for water usage, natural gas usage as well as solar or any other distributed power and energy production.

According to embodiments of the present invention, the EOS module uses a set of mathematical models to optimize and control the energy system. The models allow the energy optimizer to predict how the customer site reacts to stimuli such as weather, HVAC operation, and occupancy, for example. According to this embodiment, the models are constructed and updated automatically by the EOS module using a system identification (ID) process to enable self-calibrating/updating of the models with minimum customer interaction/intervention. The models can also be used to track changes to the site structure over time as a means for monitoring and diagnostics.

Since the EOS module relies on a set of mathematical models that represent the physics/dynamics of the site, the system can have the capability/ability to self-identify, construct, and update periodically the models by initiating a set of runs that are non-invasive/non-intrusive to the customers. The system ID is initiated by the EOS module and/or at a time of any major site modifications that would significantly impact on the site. In addition, the system ID process can adapt to dynamic variables such as seasonal climate changes, for example, with fine-tuning of the models by self-initiating a subset of the system ID runs. The system ID algorithms detect abnormal conditions, such as open windows and doors, to prevent the system ID from running. Such conditions would, otherwise, skew the system ID and the mathematical models.

According to embodiments of the invention, the energy management system includes the EOS module, connectivity to the utility, connectivity to loads and/or resources at customer sites, and a user interface or human machine interface. In addition, various configurations of the system are possible, such as a centralized architecture, a distributed architecture, and a hybrid architecture, for example.

Figure 1:
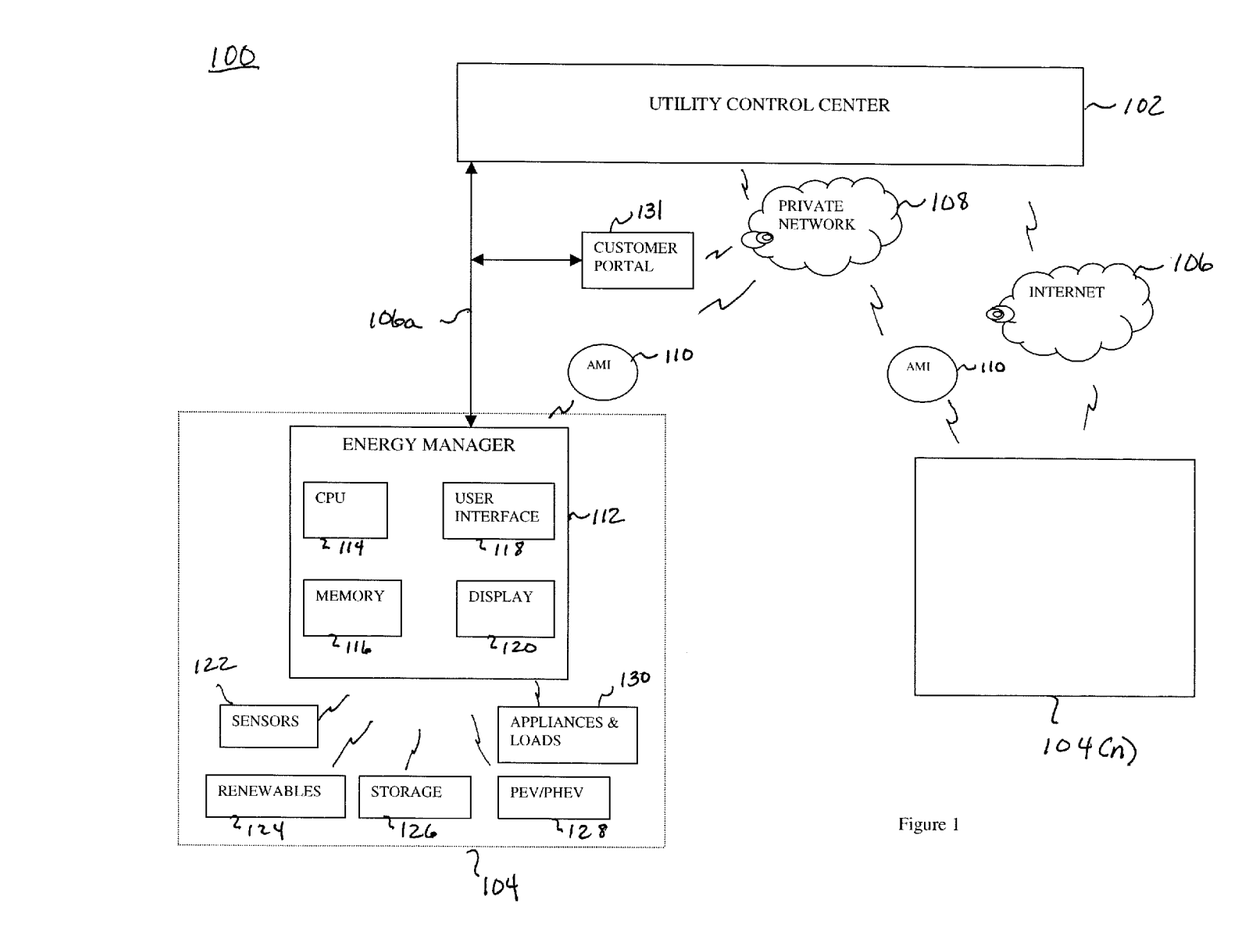
FIG. 1 illustrates a utility management system according to an exemplary embodiment of the invention.
Figure 2:
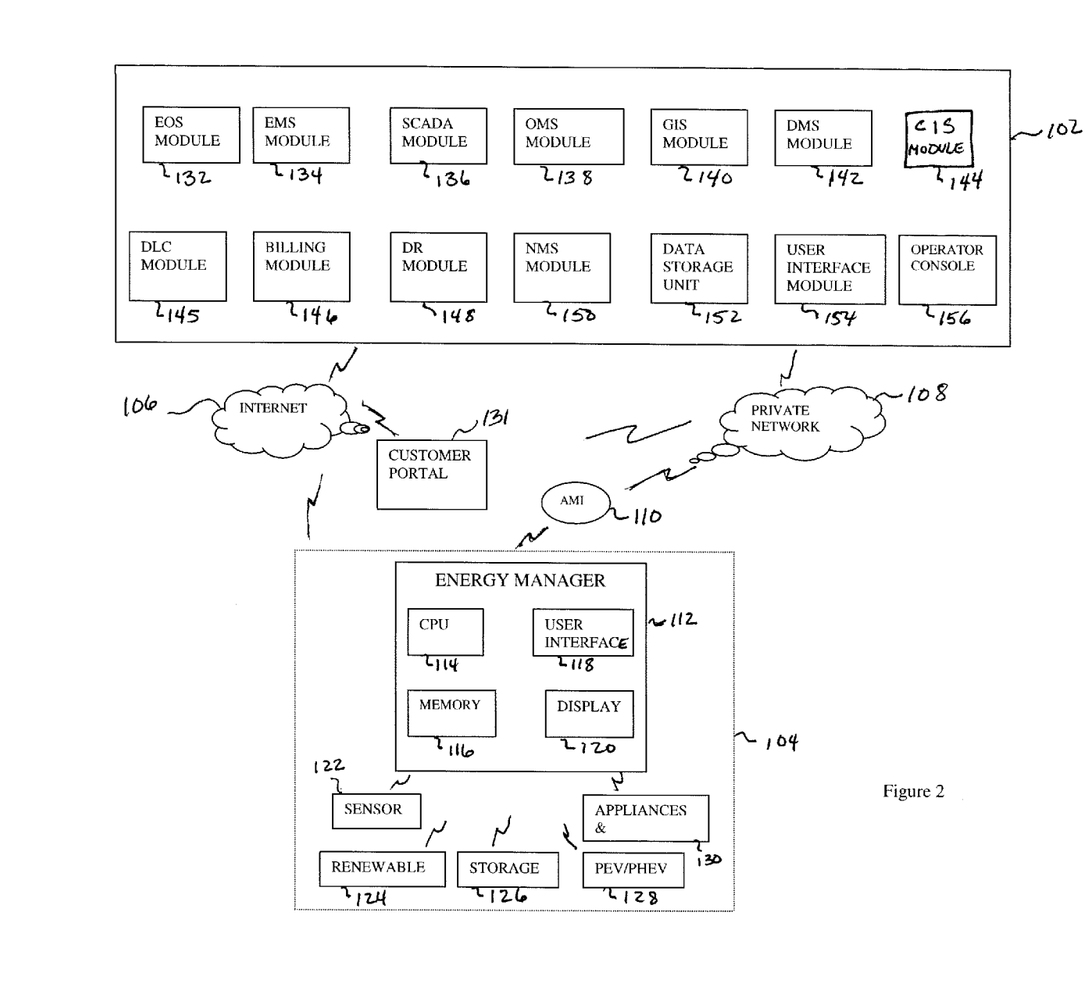
FIG. 2 illustrates a utility management system with a centralized optimization according to an exemplary embodiment of the invention.
Figure 3:
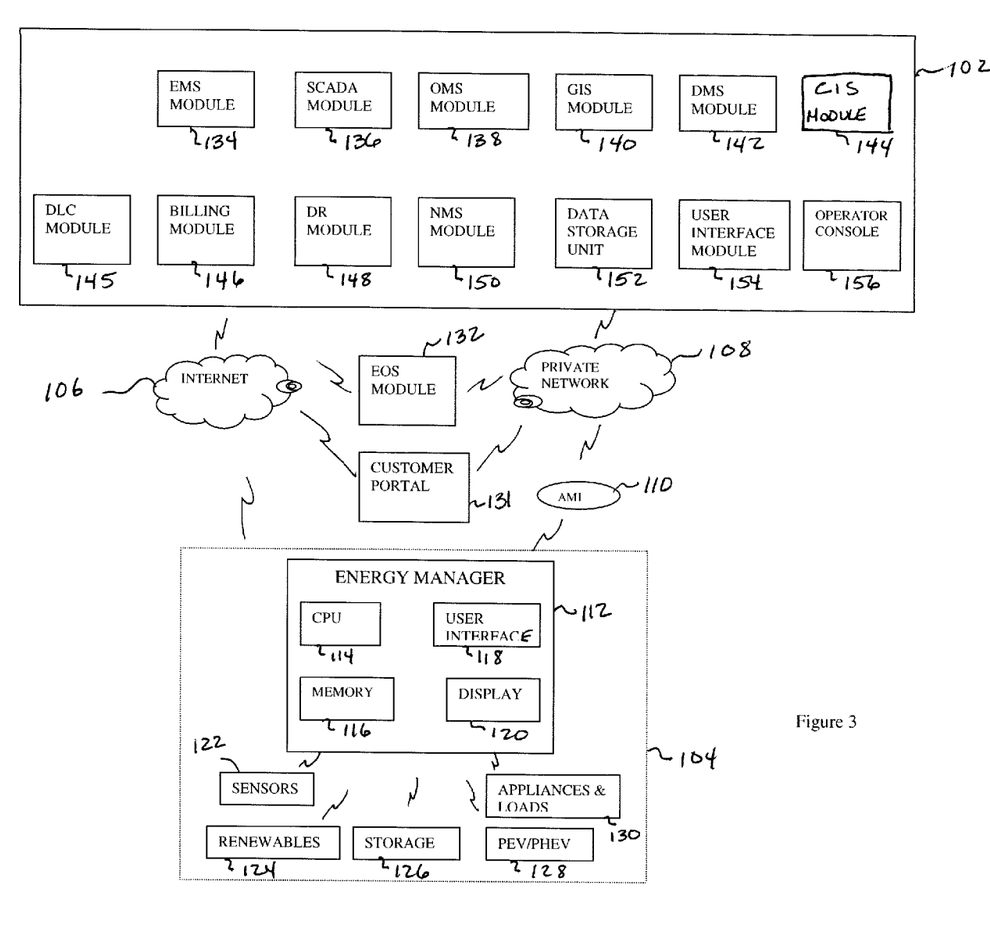
FIG. 3 illustrates a utility management system with another centralized optimization according to an exemplary embodiment of the invention.

FIGS. 1-3 show an energy management system 100 according to an exemplary embodiment of the invention where the EOS module is arranged outside of the customer site on a centralized server. According to this embodiment, the energy optimizer module monitors and optimizes utility usage at a number of customer sites. Referring to FIG. 1, the energy management system 100 includes at least one utility control center 102 and customer sites 104-104(n). Each customer site 104 includes an energy manager 112 having a processor 114, a memory 116, a user interface 118 and a display 120. The user interface 118 can include a keyboard or touch screen, for example. The processor 114 runs programs for monitoring and controlling the operation of various utility devices such as sensors 122, renewable resources 124, storage devices 126, plug in electric vehicles (PEV) or plug in hybrid electric vehicles (PHEV) 128, and other appliances and loads 130. The sensors 122 can include thermostats, occupancy sensors, humidity gauges, and other suitable devices. The renewable resources can include solar and/or wind power devices, for example. The energy manager 112 communicates with the various components using any of a number of interfaces or protocols including Zigbee, Z-Wave, Wi-Fi, and communication over power lines or PLC, for example. The energy manager 112 further supports communication via an advanced metering infrastructure (AMI) 110.

The energy manager 112 at each of the customer sites exchanges information with the utility control center over a public network 106, 106a and/or a private network 108. The public network is a WAN such as the Internet. The networking protocols for communication according to embodiments of the invention include Wi-MAX, Broadband over Power Lines (BPL), PLC, DSL/Broadband, and any other suitable standard and/or private protocols. Customer specific or sensitive information can be exchanged via the private network 108, while other communication occurs over the Internet 106, 106a. This connectivity provides various types of communication to support anticipated market growth. Three communication type examples include public pricing signaling, consumer specific signaling, and control signaling. Public pricing is the communication of material, which is publicly available. Consumer-specific signaling would be the signaling that supports a home energy management system. Control signaling are those signals used to support load shedding. Each signal type warrants individual security and privacy analysis and treatment.

Although the optimization algorithms are located outside of the customer site in the embodiments shown in FIGS. 1-3, the end-users can still have full access and control to the EOS module via a customer account on the server and input preferences, overwrites, or bypasses, for example, via a customer portal 131. Customers 104 as well as the utility control center 102 have access to the customer portal 131 via the public network 106 and/or the private network 108. The customer portal 131 provides interfaces that allow customers to monitor and control utility consumption at the customer site 104. The customer portal 131 can also include online tools and utility applications.

As shown in FIG. 2, the utility control center 102 includes the EOS module 132. In addition, the utility control center 102 includes an energy management system (EMS) module 134 that performs load forecasting for the network, and monitors, controls, and optimizes the performance of the generation and transmission system. A Supervisory Control And Data Acquisition (SCADA) module 136 provides real time information at different points in the grid and also provides local controls. An Outage Management System (OMS) module 138 monitors load status information and outage restoration information for the customer sites 104 in the network. Some of the functions performed by the OMS module 138 include failure prediction, providing information on the extent of outages and impact to customers, and prioritizing restoration efforts. The OMS module 138 operates based on a detailed network model of the distribution system that is generated and maintained by a Geographic Information Systems (GIS) module 140. A Distribution Management System (DMS) module 142 provides real-time response to adverse or unstable network conditions by providing information on load status and load response. The DMS module 142 manages the response to alarms and/or events. Customer information including service contract information, participation in incentive and/or demand response programs, and contract price information, for example, is monitored and controlled by the Customer Information System (CIS) module 144. A Direct Load Control (DLC) module 145 controls and manages customer site devices such as the thermostat—HVAC, water heater, pool pump, washer, dryer, dishwasher, LCD/Plasma TV, plug loads (e.g., computers, computer peripherals/accessories, fax machine, power supplies), refrigerator, and lighting, for example. These are mostly discrete types of devices that have on/off, eco-mode/normal mode, or multiple discrete power saving modes (e.g., dimmable lighting). Customer billing is performed by the billing module 146. A Demand Response (DR) module 148 responds to network events. A Network Management System (NMS) module 150 provides communication management and provisioning for the EOS module 132 as well as the other modules and the customer sites 104. The EOS module 132 utilizes information from the various modules in the utility control center 102 and from the energy manager 112 at each of the customer sites 104 to monitor and optimize utility usage at the customer sites 104.

The utility control center 102 also includes a data storage unit 152 for storing data such as historical data for each customer site in the network based on information from the EOS module 132, the EMS module 134, the DMS module 142, the SCADA module 136, and the OMS module 138, for example. The historical data can include information on customer utility usage including load type, time of use (TOU), duration of use, and shed or demand response events, for example. The customer usage information stored in the data storage unit 152 can be updated periodically (e.g., hourly, daily) with load data including hourly load and hourly price over a twenty four hour period, environmental data including weather information (e.g., temperature, humidity, wind speed, and solar insolation) and date and time information such as day of the week, season, etc. Finally, the utility control center 102 includes a user interface module 154 and an operator console 156.

In the embodiment shown in FIG. 2, the EOS module 132 is arranged within the utility control center 102. However, embodiments of the invention are not limited in this regard. For example, as shown in FIG. 3, the EOS module 132 can be hosted outside of the utility control center 102 and can be hosted by a party other than the utility. It can also be integrated with other energy management systems, at the transmission and distribution levels, for example, within the entire utility network.

Figure 4:
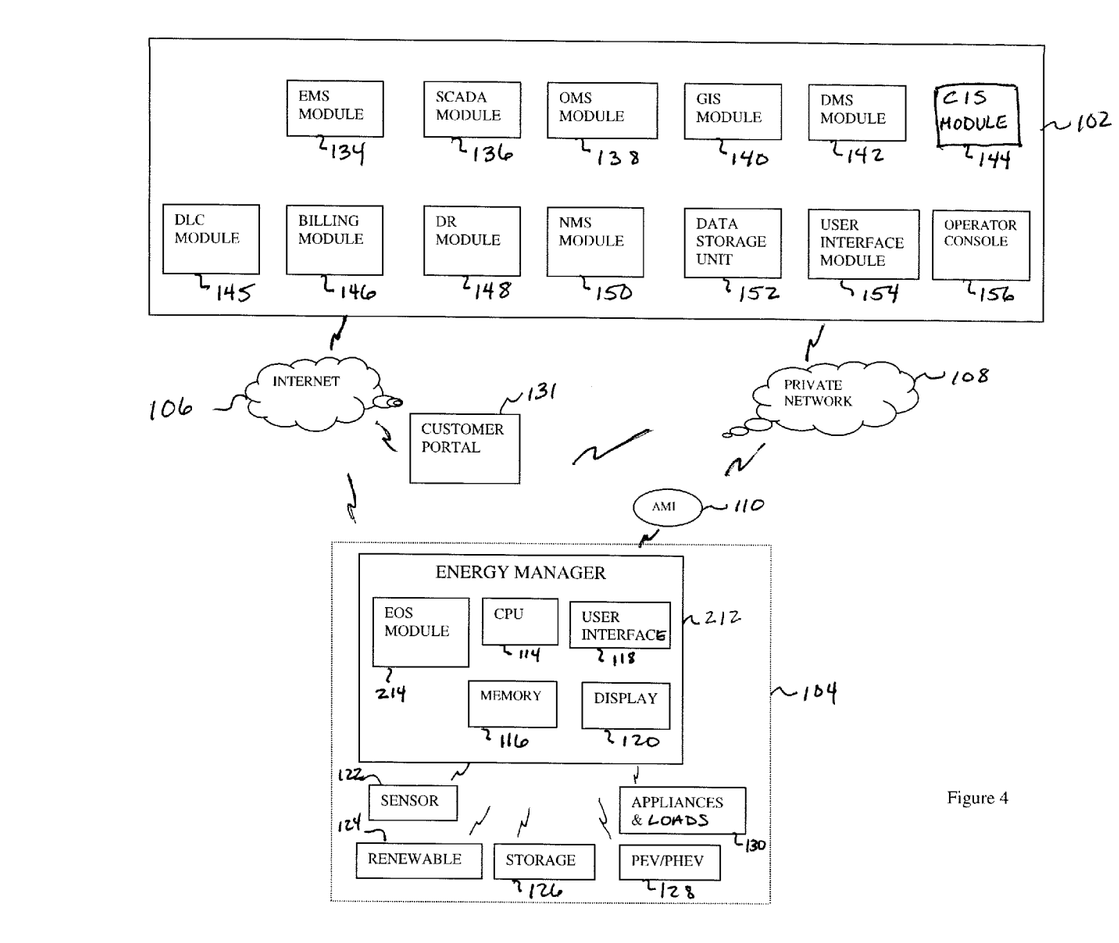
FIG. 4 illustrates a utility management system with a distributed optimization according to an exemplary embodiment of the invention.

FIG. 4 shows another energy management system according to an embodiment of the present invention. According to this embodiment, the EOS module 214 is arranged in the energy manager 212 at each of the customer sites 104. Each customer site 104 has its own dedicated energy optimizer module 214. In other embodiments, the EOS module 214 can reside in a smart thermostat, a cable set-top box, a "smart" in-home display, or other computing/smart devices with sufficient computing capability and memory in order to perform optimization and having the ability to display parameters and accept user inputs. In contrast to the embodiment shown in FIGS. 1-3, the architecture in this embodiment has all of the energy management and optimization functions and intelligence installed on a computer or personal PC at the customer site 104. The EOS module 214 communicates and interfaces with all of the other customer site components, such as meters and appliances, at the customer site. Communication with the utility control center 102 and the devices at the customer site are performed in the same manner as that described above with respect to FIGS. 1-3.

Figure 5:
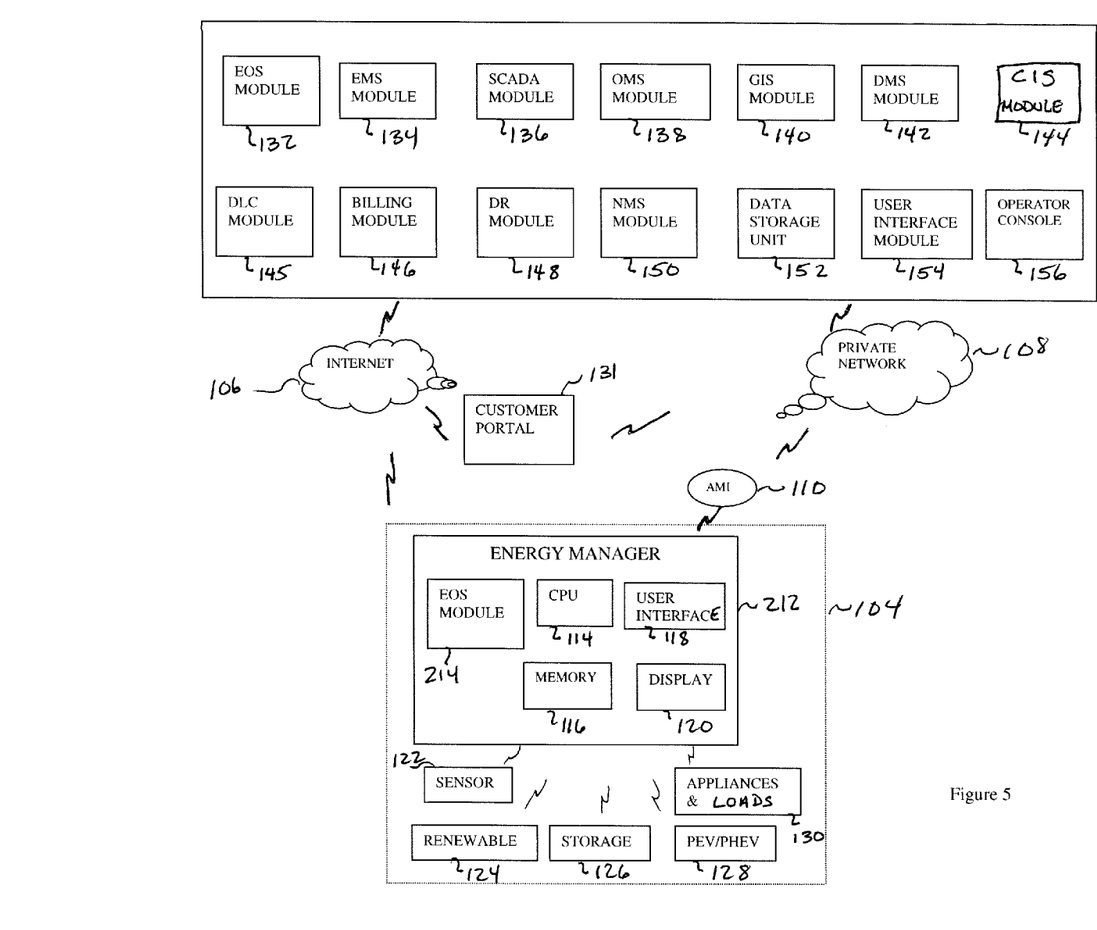
FIG. 5 illustrates a utility management system with a hybrid optimization according to an exemplary embodiment of the invention.

FIG. 5 shows yet another embodiment of the invention. According to this embodiment, the energy optimization system module is split between the central server where the EOS module 132 is arranged either at the utility control center 102 or hosted outside of the utility control center 102, and the energy manager 212 or other smart panel at the customer site to form a hybrid architecture. This hybrid approach of distributing energy management/optimization algorithms/intelligence between The EOS module 132 and the EOS module 214 at the customer site 104 offers more system flexibility. According to this embodiment, the split of the intelligence for the hybrid architecture is application dependent. One example of this hybrid approach of distributing energy management optimization algorithms and intelligence between the EOS module 132 and the EOS module 214 provides that the data pre-processing such as data filtering and averaging, for example, diagnostics and prognostics are performed by the EOS module 214 at the customer site, and all other computing and memory intensive optimizations reside on the centralized server or EOS module 132. The hybrid architecture according to this embodiment of the invention can best utilise all of the local and global (central) resources effectively to minimize the network data traffic and maximize the system efficiency and speed.

It is to be understood that the function of the EOS modules 132 and 214 can be distributed based on the needs of the application and that communication between the utility control center and the customer sites 104 remains the same as in FIGS. 1-4.

In order to facilitate the description of the embodiments of the invention, the details for a single utility control center 102 and a single utility customer site 104 are shown in the Figures. However, it should be understood that embodiments of the invention are not limited to these numbers, and that the utility can have any number of utility control centers and customers.

Also, in order to facilitate the description of embodiments of the invention below, reference will be made to EOS module 132. However, it is to be understood, that the embodiments can include EOS module 214 alone or a combination of EOS module 132 and 214.

The EOS module 132 provides a system level optimization. According to embodiments of the invention, the optimization algorithms are coupled with an adaptive customer site model that is updated automatically via a system identification process to adapt to building structure changes (e.g., renovation and/or aging) and seasonal weather changes, etc. This advanced adaptive feature ensures consistent high performance of the optimization algorithms of the EOS module 132 with maximized energy, power, and cost reduction. In addition, according to an embodiment of the invention, the EOS module 132 provides a real time estimate of costing savings/benefit as a result of customer preference/setting changes. This provides real-time feedback to the customers on how much savings can be expected by changing, for example, thermostat temperature setpoint.

According to embodiments of the present invention, the EOS module or utility optimizer, implements utility usage efficiency beyond the open-loop energy management system data display and analysis and direct load control, to a closed-loop customer site automation/energy optimization to provide system level optimization that takes into account all of the resources available to optimize the energy utilization. According to an exemplary embodiment, the EOS module 132 optimizes utility usage for customers by minimizing monthly utility bills such as electric, gas, and oil, for example, reducing wasteful utility utilization, and providing for demand-response participation. The objectives of each customer depend upon customer preferences input into the system via the user interface. In the exemplary embodiment, optimization is achieved by controlling multiple or single zone thermostat settings, battery charging or discharging, hot water heater operation, lighting operation, deferrable loads, sheddable loads, and Photo Voltaic (PV) inverter power flow. The EOS module monitors instantaneous aggregated power consumption from the utility meter, instantaneous circuit-specific power consumption through current sensors, PV power production, export of PV Watts when net-metering is available, zonal temperatures from zonal thermostats, utility cost for customers participating in a time-variable rate program, battery state of charge from battery charging unit, and export of PV VARs (Volt-Amp-Reactive), for example.

Figure 6:
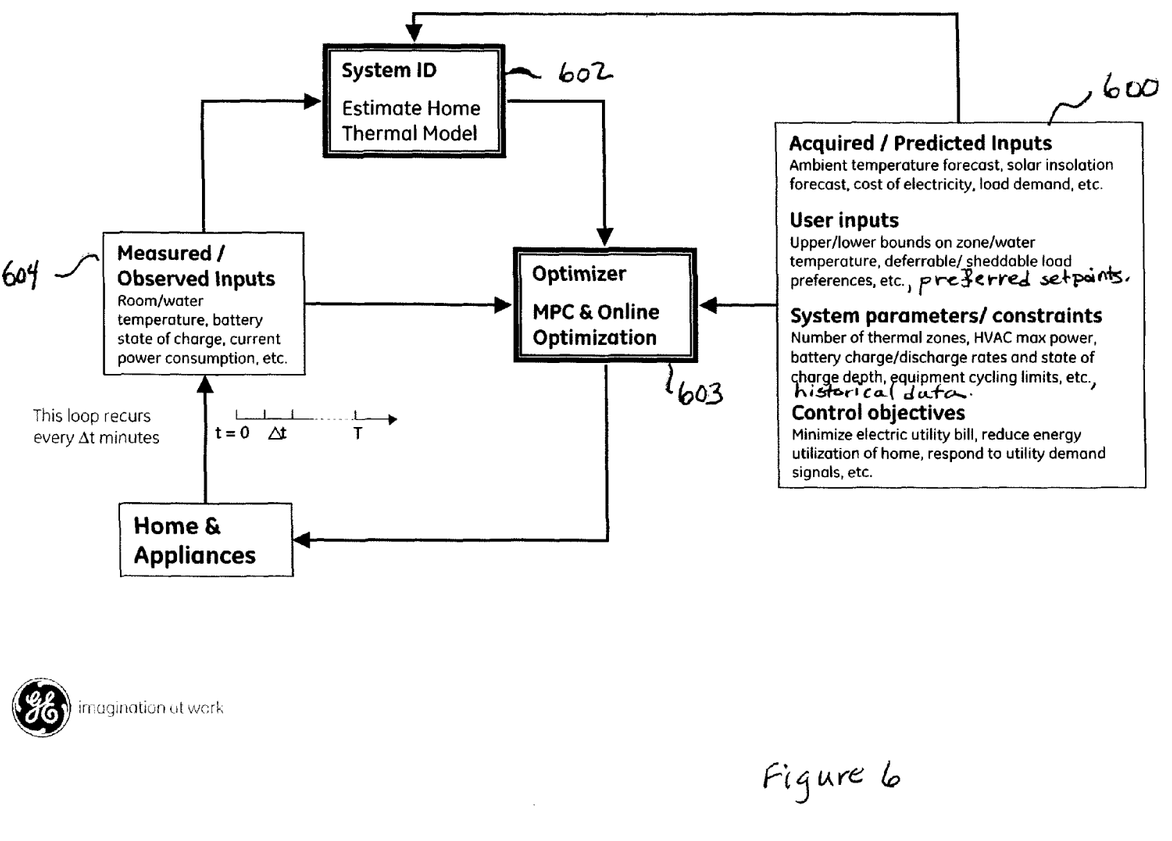
FIG. 6 illustrates an information flow diagram according to an exemplary embodiment of the invention.

FIG. 6 illustrates the information flow for the EOS module 132 for optimizing utility usage at customer sites. Input information 600 and measured/observed input information 604 are used in a system identification (ID) process 602 to generate and update a mathematical model of the customer site. The input information 600 along with the customer site model from the system ID process 602 is used to generate optimization information 603 for the customer site. In an exemplary embodiment, the input information includes user input, acquired and predicted input, system parameters and constraints, as well as control objectives.

The user input includes, for example, preferred setpoints, upper and lower bounds on a utility parameter such as zone and/or water temperature, and deferrable and sheddable load priority preferences. The acquired and predicted input includes, for example, ambient temperature forecast, solar insolation, cost of utility, and load demand. The system parameters and constraints can include the number of thermal zones, HVAC maximum power, battery charge/discharge rates and state of charge depth, and equipment cycling limits, for example. The control objectives include minimizing utility bill, reducing utility utilization at the customer site, and responding to utility demand signals, for example. The measured/observed input 604 includes room and/or water temperature, battery state of charge, and current consumption, for example. Of course, the input information and the measured/observed information can include information in addition to the examples noted herein in light of the specific application.

Optimization information 603 is generated using model predictive control (MPC) based on the input information 600, the system ID model estimate 602, and the measured/observed input 604. The electrical and thermal loads, as well as renewable generators (if they are present) in a customer site are variable. When the predicted values of these quantities are known ahead of time, it is possible to incorporate them into an optimization strategy which minimizes the total, predicted cost of operation (e.g. over a time horizon of 24 hours, known as the "prediction horizon"). This predicted cost includes the cost of buying electric power/gas from the grid or utility, as well as the profit from selling power to the grid (if this is an option). The optimal solution can be recomputed periodically (e.g., every 15 minutes) in order to take advantage of updates of the predicted loads and prices. The optimization information is used to generate commands that are sent to the utility devices and/or resources at the customer site to optimize utility usage. According to embodiments of the invention, the input information, measured/observed input, system ID information and optimization information are updated periodically. The EOS module 132 leverages historical utility usage statistics compiled throughout its operation to establish estimates of periodic (e.g., hourly) energy consumption, ambient temperature, solar insolation and other variables that can be used for planning how to best operate and control the controllable devices and/or resources.

As used herein "optimizer input information" includes the input information 600 and the measured/observed input information 604. For purposes of facilitating the description of the invention, the EOS module 132 and the system ID process 602 will be described with reference to a thermal model estimate to be used in the optimization process. However, embodiments of the invention are not limited to a thermal model estimate. The EOS module 132 can generate other models based on the particular application.

Figure 7:
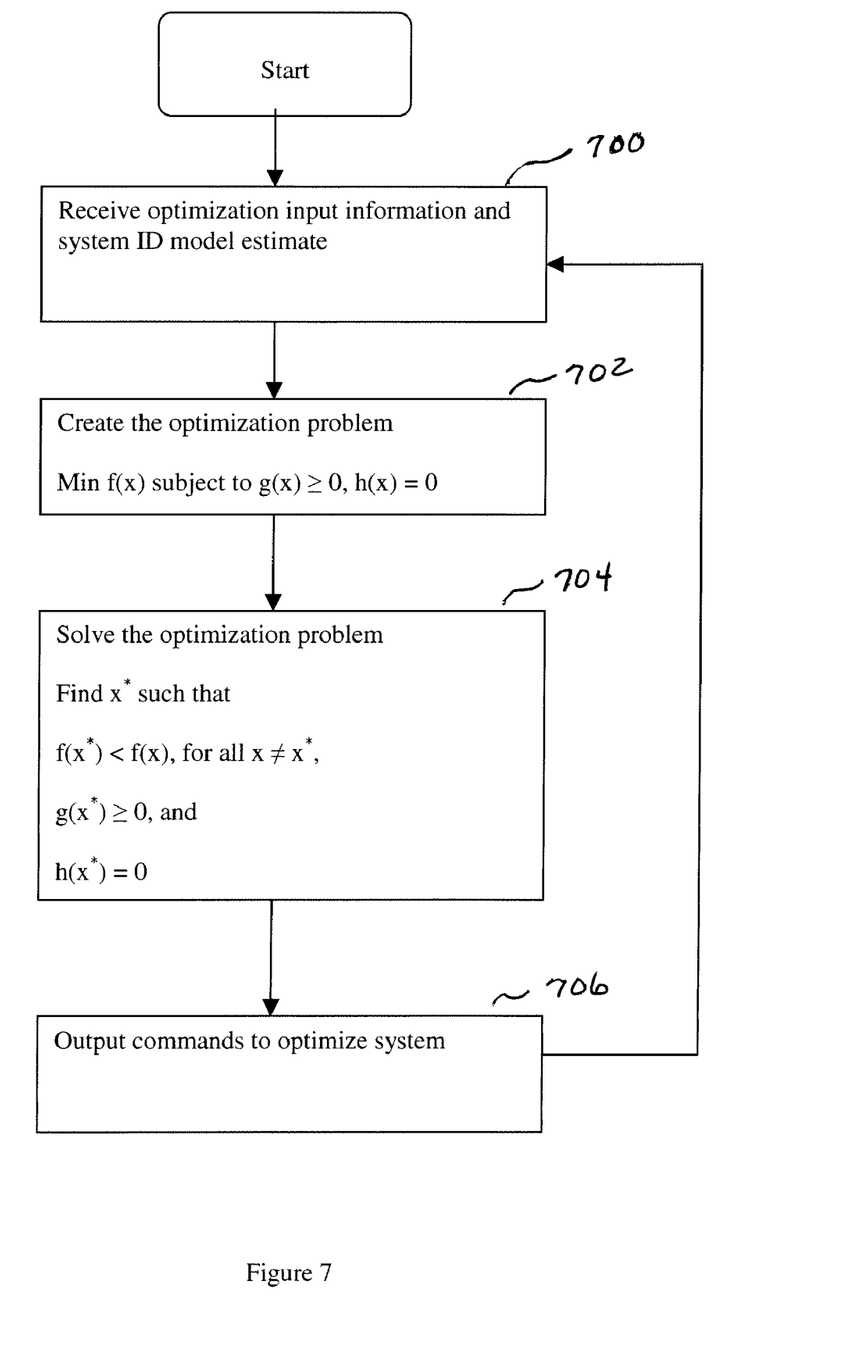
FIG. 7 is a flow diagram of an optimization process according to an exemplary embodiment of the invention.

FIG. 7 shows a flowchart of the optimization process performed by the EOS module 132 according to an embodiment of the invention. In step 700, optimizer input information and a system ID model estimate are received. In step 702, an optimization problem is formulated based on the received input. In the initial phase of energy optimization, the model data is combined with user input and passed to the algorithm as a data structure. This data structure encapsulates an instance of the optimization problem starting from the current time instant up to a point T into the future. The time period T (e.g., a day), is called the prediction horizon.

The problem data structure is parsed by the algorithm and converted into a standard optimization problem (e.g., linear programming, quadratic programming, nonlinear programming, etc.) whose objective is to minimize the cost of energy to the end user. The concatenation of all decision variables in the optimizing problem is denoted by "x", and contains zone temperature set point commands, grid/PV/battery/HVAC/appliances power flow commands, hot water set point command, and additional (slack) variables for modeling constraints, etc.

The optimization problem, according to embodiments of the invention, includes at least three blocks:

Objective function: $f(x)$, which can contain the following exemplary terms that model:

f1) cost of buying/selling power from/to the grid
f2) cost of operating of heating/cooling systems
f3) cost of operating hot water heater
f4) penalty on violation of user set temperature bounds
f5) penalty on cycling battery state of charge.
Inequality constraints: g(x)≧0, such as:
   g1) power limits of the HVAC system
   g2) user-set temperature bounds
   g3) battery minimum/maximum power
   g4) upper/lower limits on battery state of charge
   g5) maximum allowable load shedding, etc.
And, equality constraints: h(x)=0, including:
   h) power balance between generation and consumption
   h) zone heat balance
   h) hot water heat balance
   h) battery state of charge balance, etc.

The optimization problem is solved in step 704. Depending on the formulation of the problem, different solvers can be utilised to compute the vector "x*" that minimizes the objective function f(x) while satisfying the constraints g(x*)≧0 and h(x*)=0. The optimization algorithm re-computes at fixed intervals of time (e.g., 15-30 minutes) in order to receive updates on the state of the customer site (e.g., temperatures in various zones, possible change in predicted loads or weather, etc.). This interval, $\Delta t$ (e.g., in minutes) is called the sampling interval $\Delta t$ of the algorithm. In practice, $\Delta t$ should be chosen small enough that dynamic models in the optimizer can be discretized accurately at this time step.

In step 706, the EOS module 132 outputs commands to be used to control utility usage at the customer site so that utility usage is optimized. The raw vector output "x" from the optimization solver is post-processed in step 706, and correct values to the output variables are assigned. An exemplary list of outputs from the optimizer to the system is given in Table 1 below.

Figure 8:
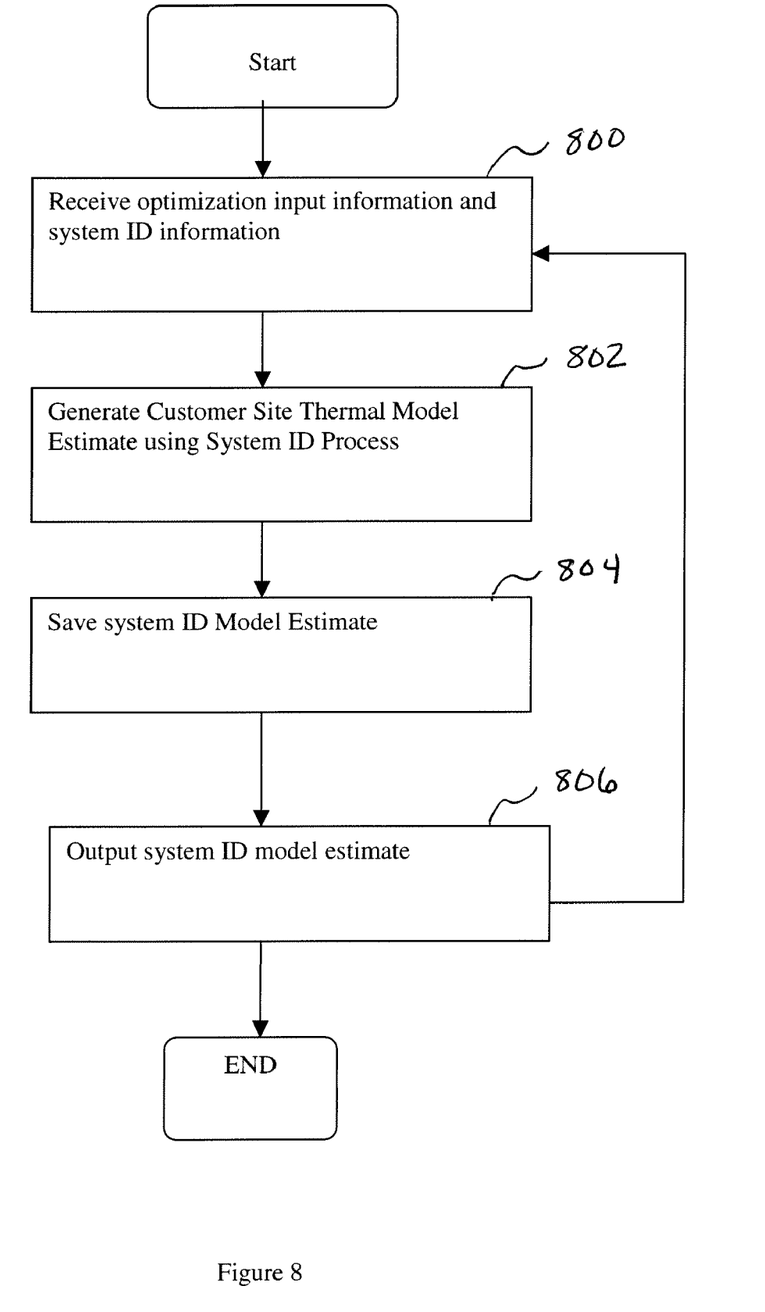
FIG. 8 is a flow diagram of a system/model identification process according to an exemplary embodiment of the invention.

System identification is the process of building a mathematical model of a dynamic system based on measured data from the system that is being identified. In the context of the exemplary customer site energy management system according to embodiments of the invention, system ID is used within the EOS module 132 to estimate a thermal model of each customer site. However, the invention is not limited in this regard, and the system ID can be used to estimate a model based on any set of parameters suitable to the application, as noted above. In this embodiment, the following discrete-time, first order customer site thermal model is used:

$$T(k+1)=AT(k)+B_1T_a(k)+B_2Q_t(k)+B_{3h}u_h(k)-B_{3c}u_c(k)$$

Where
k is the index of a given time step
$T \in R^{n_z}$ is the vector of temperatures in each zone ($n_z$: number of zones)
$T_a$ is the ambient temperature
$Q_t \in R^{n_z}$ is the vector of heat gains (internal, from people or equipment)
$u_h(k) \in R^{n_z}$ is the HVAC heating load, and $u_c(k) \in R^{n_z}$ is the HVAC cooling load
$A \in R^{n_z \times n_z}, B_1 \in R^{n_z}, B_2 \in R^{n_z \times n_z}, B_{3h} \in R^{n_z \times n_z}, B_{3c} \in R^{n_z \times n_z}$ are matrices of parameters that need to be identified.

In this embodiment, the system ID process monitors the thermal inputs to the customer site and the resulting variation in the zonal temperatures. The inputs to the system ID model are the measured room temperature (T), measured ambient temperature ($T_a$), prescribed internal heat gain ($Q_t$), measured heating load ($u_h$), and measured cooling load ($u_c$). Using this input data the system ID updates the estimated thermal model of the home, the A, $B_1$, $B_2$, $B_{3h}$, and $B_{3c}$ matrices, using the least squares error method, for example. In order for the optimizer module 132 to work effectively, the response of the system ID model must closely predict the

TABLE 1

| Name | M-Code Name | Data Type | Size | Units | Description |
|---|---|---|---|---|---|
| T | TsetptHVACOut | Float matrix | $N_z \times N$ | F | Temperature set point |
| θ | TsetptDHWOut | Float vector | N | F | DHW set point |
| $u_{gb}$ | GridToBattOut | Float vector | N | W | Power flow, grid to battery |
| $u_{pb}$ | PvtoBattOut | Float vector | N | W | Power flow, PV to battery |
| $u_b l$ | BattToLoadOut | Float vector | N | W | Power flow, battery to load |
| $q_B$ | BattSOCOut | Float vector | N | W-h | State of charge of battery |
| [$u_{ls1}$; $u_{ls2}$; $u_{ls3}$] | LoadShedOut | Float matrix | $3 \times N$ | W | Load shed recommended in tiers 1-3 |
| $u_{pg}$ | PVtoGridOut | Float vector | N | W | Power flow, PV to Grid |
| $u_{pl}$ | PVtoLoadOut | Float vector | N | W | Power flow, PV to load |
| $u_{gl}$ | GridtoLoadOut | Float vector | N | W | Power flow, grid to load |
| | GridGenOut | Float vector | N | W | Grid generation ($=u_{gl} + u_{gb} - u_{pg}$) |

The exchange of information and command responses will be discussed in more detail below.

FIG. 8 is a flow chart showing the system ID process for generating and updating a system ID model estimate of the customer site 104. In step 800, the optimization input information and the measured/observed information 604 are received. In step 802, a customer site thermal model is generated using the system ID process. The system ID process compares the predicted zone temperature from the current site thermal model estimate with the actual zone temperature from the sensor measurements, and updates the thermal model estimate by using the mismatch between predicted and actual zone temperatures. The customer site thermal model is saved in step 804, and the system ID model estimate is output for use in optimization in step 806.

thermal response of the customer site. To achieve this goal, a recursive system ID algorithm is used; the thermal model is updated as the input data is received, thereby allowing it to follow changes in the thermal response of the customer site caused by seasonal changes, structural changes, open windows, etc.

The optimizer module 132 uses the thermal model to calculate the optimum temperature set point for all zones in the customer site so as to minimize the cost of heating or cooling required for maintaining the temperatures within a user defined comfort zone.

According to an embodiment of the invention, the following system ID algorithm is implemented in the EOS module 132 to solve for the thermal model estimate. φ is the input matrix to the system ID algorithm; $\hat{\theta}$ is the estimated thermal model parameters comprised of the coefficient matrices of the thermal model; γ is a pre-specified forgetting factor that determines how far back the historical data will be utilized in the system ID algorithm.

$$\hat{\theta}(k) = \hat{\theta}(k-1) + L(k) * \left[T(k) - \hat{\theta}^T(k-1) * \varphi(k)\right]^T$$

$$L(k) = \frac{1}{\gamma} * [P(k-1) * \varphi(k)] * \left[\frac{1}{\alpha} + \varphi^T(k) * \frac{P(k-1)}{\gamma} * \varphi(k)\right]^{-1}$$

$$P(k) = \frac{1}{\gamma} * [I - L(k) * \varphi^T(k)] * P(k-1)$$

Where,
$\hat{\theta} = [A\ B_1\ B_2\ B_{3h}\ B_{3c}]^T$
$\phi = [T\ T_a\ Q_r\ u_h\ u_c]^T$
γ=forgetting factor
α=1-γ.

The performance of the system ID algorithm is characterized at least by (1) the time it takes the algorithm to converge to the actual model, and (2) the sensitivity of the algorithm to measurement noise. Both of these characteristics are strongly impacted by the choice of forgetting factor. The forgetting factor is between 0 and 1. A small forgetting factor results in an algorithm that quickly forgets the previous parameters. This is good for fast tracking of the model parameters, but causes the algorithm to be highly sensitive to noise. A large forgetting factor results in an algorithm that remembers the previous parameter values, resulting in slow tracking of the parameters, but has the advantage of being less sensitive to noise. The forgetting factor can be set based on the application.

Figure 9:
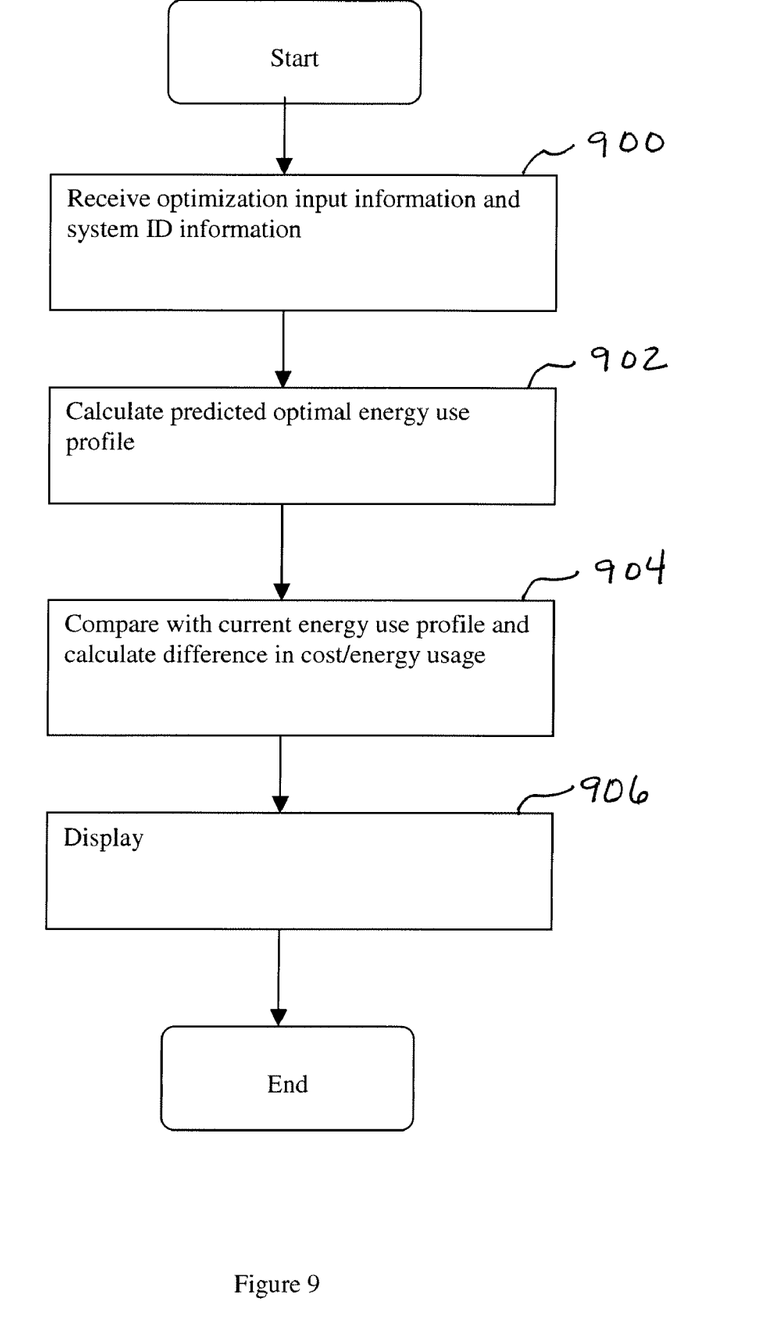
FIG. 9 is a flow diagram of a real-time utility consumption and cost estimate process according to an exemplary embodiment of the invention.
Figure 10:
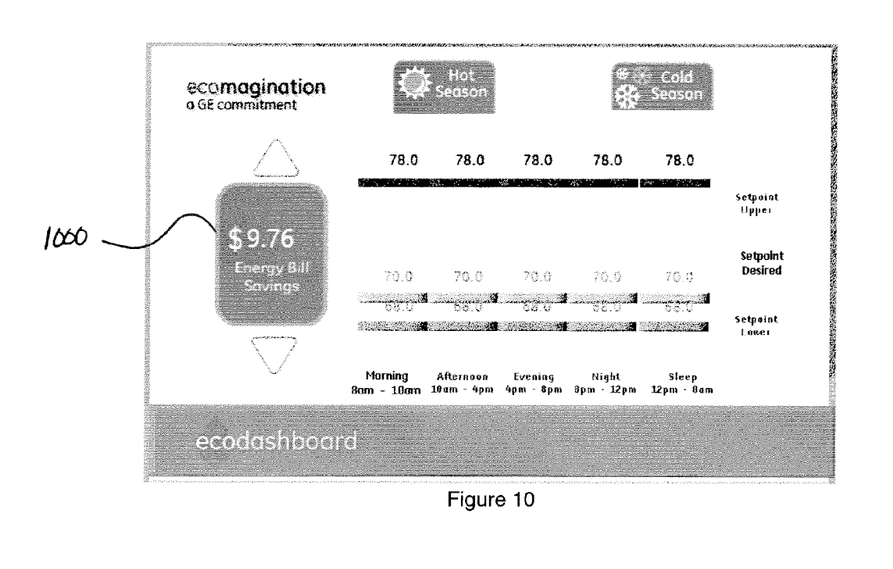
FIG. 10 is a screen shot of a user interface according to an exemplary embodiment of the invention.

The EOS module 132 also generates a real-time estimate of utility costs as the customer makes adjustments to their preferences on the user interface. This feature can be used to guide the customer by showing (in real time) the cost difference that would result if the customer site were to be run at a different set of preferences. FIG. 9 is a flow chart showing the process for providing a real-time estimate of utility use costs. In step 900, the optimization input information and the measured/observed information 604 (including the new user settings) are received. In step 902, the received information is used to run the EOS engine and optimize the future energy use assuming that the new user settings were to be applied. The EOS engine is only run once. According to this embodiment, the output is not used to control the customer site until the user issues a final confirmation to use the new settings (unlike the process in FIG. 7 where the optimization is run periodically and used to update the control signals to the customer site). However, there are other operating processes are possible. In step 904, the new energy use profile is compared with the current profile and the difference in cost/energy use is calculated. The potential cost difference is computed for a fixed time horizon (e.g., one month) into the future. This result is displayed in step 906. Thus, the user gets a real-time estimate of the decrease or increase in cost that would result as a consequence of running the customer site differently. FIG. 10 illustrates an exemplary display according to an embodiment of the invention, showing energy price savings 1000.

The smart devices or traditional devices at a customer site can be controlled and coordinated in two interacting groups. In one embodiment of the invention, the energy optimizer of the EOS module 132 controls and coordinates the thermostat/HVAC, water heater, and Solar PV and battery storage etc., and all the other devices are controlled and coordinated via the direct load control module 145. In another embodiment of the invention, all of the devices are controlled by the direct load control module 145, and in an additional embodiment, the EOS module 132 controls and optimizes all of the device operation.

Figure 11:
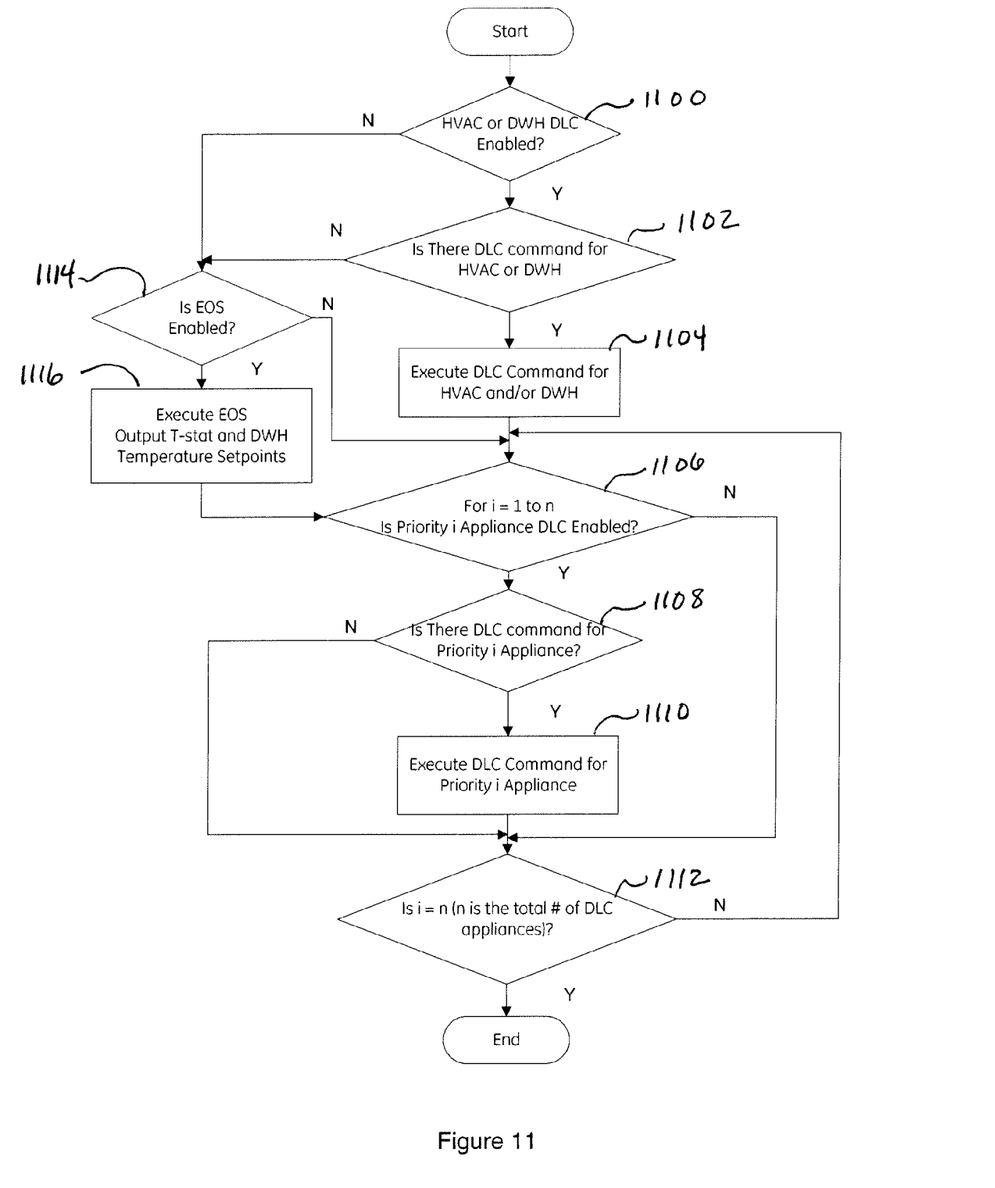
FIG. 11 is a flow diagram of a direct load control process according to an exemplary embodiment of the invention.

FIG. 11 is a flow chart showing an exemplary flow of device control and coordination between the EOS module 132 and the DLC module 145. In step 1100, it is determined whether DLC control is enabled for the HVAC or domestic hot water heater (DWH), for example. If yes, then in step 1102, it is determined whether the there is a DLC command for the HVAC or DWH. If yes, processing continues to step 1104 where the DLC command is executed for the HVAC and/or DWH. Step 1106 determines whether the $i^{th}$ priority device is a DLC enabled. If yes, then step 1108 checks for actual DLC command. If yes, the DLC command is executed in step 1110 for the $i^{th}$ priority device. If no, step 1110 is skipped. Step 1112 checks to see if all the DLC commands have been executed for all the DLC enabled devices. If yes, complete the current cycle of the DLC control, otherwise, keep go back to step 1106 for the next DLC device.

If the answer in either of steps 1100 or 1102 is no, then processing proceeds with step 1114 where it is determined whether the EOS Module is enabled. If yes, then the energy optimization process is executed in step 1116 to output the optimized thermostat and/or water heater temperature settings. If the answer in step 1114 is no, then processing proceeds to step 1106.

The direct load control functionality enhances the EOS module 132 by complimenting the energy optimizing function. It includes direct load control analytics, feedback to the utility, load scheduling, usage planning and negotiation. It provides a channel for the utility's demand side management (DSM) to control the loads that are not managed by the optimizer. The user has the ability through the user interface to allow or disallow the direct load control functionality.

Direct load control feedback integrates the utility's direct load control signaling into the EOS module 132 and gives the utility control of customer site loads in the event of a utility direct load control signal. The direct load control module 145 negotiates and plans usage for discrete-operation devices. This function plans and coordinates the operation between devices based on the device constraints, user preferences and priority, and cost of operation, for example.

According to an embodiment of the invention, the appliances or devices at a customer site are ranked in the order of descending energy consumption from the top to the bottom. This is also the default priority ranking for the DLC module 145 when a load shedding command is received from the utility and the DLC function is enabled by the customer. The default priority list also takes into account the nature of the devices, the comfort of the customers, and criticality of the devices. Of course, the default priority ranking can be overwritten by the customers per their specific preferences and choices.

A DLC event initiated from the utility is most commonly used for peak load reduction, especially for emergency load shedding. It provides an effective and economic tool for the utility to manage its load/power demand with optimally dispatched or minimized generation resources/spinning reserves. It also enhances reliability of the electric power system to avoid power outages and thus improve customer satisfaction. In addition to the benefits utilities enjoy from DLC, end use customers also benefit from the savings DLC generates. DLC is also relatively simpler to implement and adopt compared with other energy management/optimization algorithms.

The following is a description of exemplary types of information exchanged in the energy management system disclosed herein. Most of the functions and information flow defined and described below apply to smart appliances. For existing traditional appliances, the control application will be predominately discrete on and off controls with a smart outlet plug, for example.

Specifically, the following are exemplary information exchanges: appliance and device accept control signals from the user interface and the EOS module 132, appliance and device respond to requests to cease operational state (e.g., open contact, turn off device), appliance and device respond to requests to resume operational state (e.g., close contact, turn on device), appliance and device respond to requests to cease operational state (e.g., open contact, turn off device) at a specific time, appliance and device respond to requests to resume operational state (e.g., close contact, turn on device) at a specific time, appliance and device delay restoration of operational state based on a pre-configured time (e.g., random number), appliance and device respond to request to cycle operational state (i.e., duty cycle), appliance and device respond to request to limit operational mode based on thresholds, setpoints, and/or triggers (e.g., price points), and appliance and device respond to requests for variable output (e.g., load limiting, energy saving mode).

Measurement and monitoring applications provide internal data and status, that include, but are not limited to, solar, wind, and fuel cell states, metering of devices within the site (e.g., customer PHEV), monitoring of local conditions (e.g., temperature, humidity, time, airflow, ambient light level, motion), and monitoring of a device state. These applications provide inputs to the EOS module 132 and enable processing, optimization, and action based upon the inputs.

Exemplary detailed and specific information flow from the devices to the user interface include: appliance and device acknowledge receipt of control signal, appliance and device acknowledge execution of control signal, appliance and device notify execution failure of control signal, appliance and device signal any consumer-initiated overrides from the appliance, appliance and device measure and report instantaneous power demand, appliance and device measure and report total accumulated energy consumption, appliance and device measure and report total accumulated energy production, appliance and device measure and report periodic accumulated energy consumption for a configured time interval (e.g., Wh, BTU, HCF), appliance and device measure and report accumulated energy production/DG for a configured time interval, appliance and device store interval measurement (e.g., 30 days of interval reads), appliance and device allow interval configuration (e.g., 15 minutes), appliance and device monitor and report energy state (e.g., state of charge), appliance and device measure and report available capacity (e.g., W, Volt-Amps), appliance and device monitor and report device state (e.g., operational, stand-by, maintenance), appliance and device (e.g., inverter) monitor and report the operational mode (e.g., charging, discharging), appliance and device measure and report power quality (e.g., frequency, neutral voltage, harmonic content), and appliance and device monitor and report environmental state (e.g., temperature, motion, wind).

A smart meter provides the following exemplary information to the EOS module 132: direct load control request/command, including programmable communicating thermostat (PCT), critical peak pricing (CPP), total electrical energy consummation, consumer alert message, meter ID (e.g., IP address), sub-metering for solar PV and PHEV, utility billing and payment (this can come from the "dashboard and Ethernet interface" as an alternative), power outage/grid status, rebate and other incentives—e.g., peak time rebate (PTR), real-time pricing (RTP), and time of use (TOU). Consumer alert messages prompt users with significant event or pricing changes. They can provide users useful information that can be used to make decisions on reducing energy consumption, increasing efficiency or improving system reliability.

While embodiments of the invention have been described in the context of an electric utility, it will be appreciated by those skilled in the art that the method and system can be used for any utility network.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A utility management system, comprising:
    a plurality of customer sites connected to a utility network, wherein each of the customer sites comprises one or more utility devices;
    a plurality of utility management user interfaces associated with the customer sites, respectively; and
    a controller coupled to the utility management user interfaces via a private network and configured to communicate customer utility optimization information to the utility management user interfaces, wherein the controller comprises:
        a first module configured to exchange customer site information comprising measured information, predicted information and customer input information with each of the customer sites, wherein the customer site information is specific to each customer site;
        a second module configured to generate an adaptive customer site model capable of adapting to customer site changes including structural changes for each customer site by performing a system identification process based on the customer site information, and wherein the system identification process uses a system identification algorithm which is self-updating or configured to update when changes in the one or more utility devices are detected;
        a third module configured to generate the customer utility optimization information for each of the customer sites using model predictive control based on the adaptive customer site model, the customer site information, system constraints and control objectives;
        a fourth module configured to output a real-time estimate of utility usage cost savings based on the customer utility optimization information to each of the customer sites.

2. The utility management system of claim 1, wherein the predicted information comprises at least one of weather information, solar insolation forecast information, cost of utility unit, utility program information, and load demand.

3. The utility management system of claim 1, wherein the customer input information comprises at least one of usage preferences, customer site specification information, and customer settings.

4. The utility management system of claim 1, wherein the controller is further coupled to the utility management interfaces via a public network.

5. The utility management system of claim 4, wherein the public network is the Internet.

6. The utility management system of claim 1, wherein at least a portion of the customer site information is exchanged between the controller and the utility management interfaces via the private network.

7. The utility management system of claim 6, wherein at least a portion of the customer site information is exchanged between the controller and the utility management interfaces via a public network.

8. The utility management system of claim 1, wherein at least a portion of the customer utility optimization information is communicated to the utility management user interfaces via the private network.

9. The utility management system of claim 8, wherein at least a portion of the customer utility optimization information is communicated to the utility management user interfaces via a public network.

10. The utility management system of claim 1, wherein the utility management user interfaces each comprise:
 a data module configured to receive the customer input information and the customer utility optimization information for an associated customer site; and
 a control module configured to control the one or more utility devices based on the customer input information and the customer utility optimization information.

11. The utility management system of claim 10, wherein the control module outputs local control commands to the one or more utility devices via a wireless network.

12. The utility management system of claim 10, wherein the control module generates local optimization information based on the customer input information, and controls the one or more utility devices based on the local optimization information.

13. The utility management system of claim 1, wherein the third module generates a customer optimization problem by formulating an optimization problem including an objective function and at least one of an inequality constraint parameter and an equality parameter; and solving the optimization problem of the objective function with respect to the at least one of the inequality constraint parameter and an equality parameter.

14. The utility management system of claim 1, wherein a part of the third module is located at the customer site and another part of the third module is located at a central location.

15. The utility management system of claim 1, wherein the adaptive customer site model comprises a thermal model represented by:

$$T(k+1)=AT(k)+B_1 T_a(k)+B_2 Q_t(k)+B_{3h} u_h(k)-B_3 u_c(k)$$

wherein k is an index of a given time step, T is a vector of temperatures, $T_a$ is an ambient temperature, $Q_t$ is the vector of heat gains, $u_h$ is a HVAC heating load, $u_c$ is a HVAC cooling load and A, $B_1$, $B_{3h}$, $B_3$ are matrices of parameters.

16. A system for optimizing customer utility usage at a customer site connected to a utility network, comprising: one or more utility devices; and
a controller coupled to the one or more utility devices for optimizing utility usage at the customer site, wherein the controller comprises:
 a first module configured to receive customer site information comprising real-time measured information, predicted information and customer input information, wherein the customer site information is specific to the customer site;
 a second module configured to generate an adaptive customer site model capable of adapting to customer site changes including structural changes for each of the customer sites by performing a system identification process based on the customer site information, and wherein the system identification process uses a system identification algorithm which is self-updating or configured to update when changes in the one or more utility devices are detected;
 a third module configured to generate customer utility optimization information using model predictive control based on the adaptive customer site model, the customer site information, system constraints and control objectives;
 a fourth module configured to output a real-time estimate of utility usage cost savings based on the customer utility optimization information.

17. The system of claim 16, wherein the predicted information comprises weather information, solar insolation forecast information, cost of utility unit, utility program information, and load demand.

18. The system of claim 16, wherein the customer input information comprises at least one of usage preferences, customer site specification information, and customer settings.

19. The system of claim 16, wherein the controller outputs commands to the one or more utility devices via a wireless network.

20. The system of claim 16, wherein at least a portion of the customer site information is received from an external source via a public network.

21. The system of claim 16, wherein at least a portion of the customer site information is received from an external source via a private network.

22. The system of claim 21, wherein the private network is wireless.

23. The system of claim 16, wherein the third module generates the customer utility optimization information by formulating an optimization problem including an objective function and at least one of an inequality constraint parameter and an equality parameter; and solving the optimization problem of the objective function with respect to the at least one of the inequality constraint parameter and an equality parameter.

* * * * *